United States Patent [19]

Meinzer et al.

[11] Patent Number: 5,257,090

[45] Date of Patent: Oct. 26, 1993

[54] LASER DIODE LIQUID-LEVEL/DISTANCE MEASUREMENT

[75] Inventors: Richard A. Meinzer; Bruce E. Zepke, both of Glastonbury, Conn.

[73] Assignee: United Technologies Corporation, Hartford, Conn.

[21] Appl. No.: 800,336

[22] Filed: Nov. 27, 1991

[51] Int. Cl.⁵ .............................................. G01B 9/02
[52] U.S. Cl. .................................... 356/358; 356/4.5; 356/356; 250/205; 250/576
[58] Field of Search ................... 250/205, 576; 356/3, 356/4, 4.5, 5, 345, 356, 358, 349

[56] References Cited

U.S. PATENT DOCUMENTS

| 4,928,152 | 5/1990 | Gerardin | 356/5 |
| 5,020,901 | 6/1991 | de Groot | 356/4.5 |

FOREIGN PATENT DOCUMENTS 0191658 8/1986 European Pat. Off.
0235034 9/1987 European Pat. Off.

OTHER PUBLICATIONS

High-Resolution Range Finder With Wide Dynamic Range of 0.2 m to 1 m Using a Frequency-Modulated Laser Diode (IECON '89, vol. 1, Nov. 1989); S. Snhinohara et al.

Primary Examiner—Samuel A. Turner
Assistant Examiner—LaCharles Keesee
Attorney, Agent, or Firm—Gerald L. DePardo

[57] ABSTRACT

A laser diode distance measurement device includes a laser diode assembly 10, comprising a laser diode and photodiode, which emits light 17 to a lens 19 which provides collimated light 20 incident on a float 22 which is covered with reflective tape on its top surface 24. The light 20 is reflected from the float 22 back to the laser diode assembly 10 which causes the assembly 10 to provide a signal having magnitude pulses (due to coherent interference) on a line 15 to a liquid level measurement circuit 14 related to the distance L to the float 22. Use of the collimated beam 20 and reflective tape on the float 22 minimizes speckle while providing adequate optical intensity feedback. The laser assembly 10 is driven by a sawtooth waveform signal that reduces electronic processing. The distance measurement circuit 14 blanks-out the feedback signal during discontinuities of the laser diode drive signal to minimize associated noise from distorting the distance measurement. Alternatively, the float may be omitted and the tube 11 made small enough to provide a meniscus effect curvature at a liquid surface 250 which provides a curved reflective surface to reflect the incident light 20, in a consistent fashion, back to the laser assembly 10.

14 Claims, 4 Drawing Sheets

LASER DIODE LIQUID-LEVEL/DISTANCE MEASUREMENT

CROSS-REFERENCE TO RELATED APPLICATIONS

Copending U.S. patent applications, Ser. Nos. (800,335 and 800,190), filed contemporaneously herewith contain related subject matter to that disclosed herein.

TECHNICAL FIELD

This invention relates to distance measurement and more particularly to laser diode coherent interference-based distance measurement.

BACKGROUND ART

It is known that semiconductor lasers, such as laser diodes, may be used for measuring distances as described by: G. Beheim et al., "Range Finding Using Frequency-Modulated Laser Diode", *Applied Optics*, Volume 25, No. 9 (1986). It is also known that light may be used to measure the level of a liquid.

A laser diode typically has an optical cavity comprising two opposing polished ends (called facets) each having a known index of refraction and having a light amplifying medium therebetween. Light is generated inside the diode cavity by passing electric current through the p-n junction of the diode (typically using ends of the diode other than the facets). The light inside the diode cavity is reflected from a first (e.g., front) facet to a second (e.g., rear) facet in a repetitive manner, thereby providing stimulated emission and the well known laser action. Typically, the front and rear facets are partially transparent (i.e., not 100% reflective). Thus, some light exits the laser from both the front and rear facets. The amount of light exiting an uncoated facet is determined by its index of refraction.

The behavior of a laser diode, as is known, can be significantly affected by external optical feedback, i.e., feedback of a portion of the laser output light back into the laser cavity from an external reflecting surface, as described in the article: R. Lang et al., "External Optical Feedback Effects on Semiconductor Injection Laser Properties", *IEEE Journal of Quantum Electronics*, Volume QE-16, No. 3 (March 1980). A laser diode together with an external reflective surface, e.g., a reflective target, can be viewed as a compound or coupled laser cavity consisting of the diode cavity and an external cavity formed by the reflective target and the laser diode facet facing the target (e.g., the front facet). The distance from the laser to the external surface must be no longer than one-half the coherence length (the distance over which the photons remain in-phase) of the output light because the light must remain coherent over the entire distance traveled (i.e., out to the target and back to the laser). Coupled-cavity effects in conventional lasers are well known, as described in U.S. Pat. No. 4,550,410 entitled "Coupled Cavity Laser" to Chenausky et al.

It is also known that if the current through a laser diode is changed from one level to another, the optical frequency that the laser diode operates at (or "lases" at; also called the "free running" frequency) will change in response thereto. More specifically, when the current is increased, the wavelength of the laser diode gets longer and, thus, the frequency that it operates at decreases. This occurs, as is known, because the temperature of the laser diode material changes with current, which causes a change in the index of refraction of the material, which causes a change in the cavity optical path length $L_d$ (also called effective diode cavity length) which is the product of the index of refraction of the laser material and the physical length of the laser cavity.

It is also known that as the optical operating frequency of the laser changes, the intensity of output light emitted from the facet not facing the target will exhibit ripples or undulation pulses (also called "mode-hops"). These intensity pulses are due to coherent interference within the laser diode between the light reflected from the target (that reenters from the facet facing the target) and the light inside the laser diode (provided the distance from the laser to the target stays fixed). Pulses occur, as is known, at laser operating frequency intervals equal to the frequency difference between consecutive external cavity modes:

$$c/2L \qquad \text{Eq. 1}$$

where c is the speed of light and L is the distance from the front facet to the target. It is also known that these pulses can be readily detected by differentiating the light intensity signal emitted from the rear facet.

If the target is an integral number of laser diode cavity optical path lengths $L_d$ from the laser diode, maximum constructive coherent interference occurs, and the peak amplitude of the output intensity pulses are a maximum. Similarly, if the distance from the target to the laser diode is a non-integer multiple of $L_d$, the peak amplitude of the pulses are reduced due to mode pulling effects (as discussed in Lang et al), but are still measurable. Thus, the peak amplitude of the intensity pulses varies with the distance but are still measurable independent of whether or not the target is an integer multiple of $L_d$ from the laser, as described in Lang et al.

In known laser diode distance measurement experiments, such as that described in Lang et al. and Beheim et al., a known photo detector and accompanying electronics have been used to measure the light emitted from the rear facet of the laser and to produce a voltage signal indicative thereof. The voltage signal from the detector is analyzed to determine distance information.

The distance L from the front facet to the target is given by the known relationship:

$$L = Nc/2\Delta F \qquad \text{Eq. 2}$$

where N is the number of intensity pulses (or external cavity "mode-hops") that occur over the laser frequency change $\Delta F$; c is the speed of light; and $\Delta F$ is the change in laser frequency that occurs due to the change in laser diode drive current. L is very much (many orders of magnitude) larger than the optical path length of the laser diode cavity. Thus, the distance L to the target may be determined by merely counting the number N of "mode-hops" that result from the laser frequency change $\Delta F$. The theoretical resolution in distance measurement, as is known, is the distance corresponding to one "mode-hop" or:

$$\Delta L = c/2\Delta F \qquad \text{Eq. 3}$$

Thus, if $\Delta F = 50$ GHz, then $\Delta L = 3$ mm, which is good resolution, as discussed in Beheim et al. For a distance of 1 meter, the number of pulses N on the ramp is about 300.

Also, it is known that if the target is in motion (i.e., has a finite velocity), additional pulses (with similar amplitude characteristics as those discussed hereinbefore) will appear on the laser output signal due to a known Doppler effect (called the Doppler frequency Fd). This occurs whether or not the laser diode drive current (i.e., the laser optical frequency) is changing with time. Consequently, the total number of pulses per sweep of the drive current (herein called a ramp cycle) emitted from the laser is related to the distance (Fx) and the velocity (Fd) of the target. More specifically, for an up-down current ramp drive signal (positive sloped ramp followed by a negative sloped ramp), when the drive current is increasing and the target is moving toward the laser, the number of pulses seen on the feedback is: Fx+Fd. Conversely, when the drive current is decreasing and the target is moving toward the laser, the number of pulses seen is: Fx−Fd. If Fd is greater than Fx (i.e., the target is moving faster than a certain speed) the result of the relation: Fx−Fd, is negative and the direction of the pulses on the decreasing slope will change polarity. If the target is moving away from the laser, the above relationships are the same except the sign of Fd is reversed for both cases, as is known.

However, numerous problems occur in attempting to implement laser diode coherent interference-based distance measurement in a real-world environment. First, one of the largest problems with coherent light detection is speckle noise. Speckle noise, as is known, is an optical noise generated as a consequence of the scattering of coherent light when it hits a surface that is not perfectly flat (on a wavelength scale). Also, all targets exhibit a finite amount of surface vibration, which increases speckle noise. Furthermore, if the target is floating, such as a float in the gas tank of a car, some motion/oscillation will exist which also increases speckle noise. This noise interferes with coherent detection and can cause the optical intensity to drop-off periodically as a function of distance to the target, thereby preventing intensity measurement at certain distances (i.e., measurement drop-out) and making distance measurement unreliable. Also, a focussed beam is typically used (as shown in Beheim et al. and Lang et al.) to achieve the needed intensity at the target to provide adequate optical feedback.

Second, Beheim et al. discusses using an up-down ramp current waveform to drive the laser diode; however, an up-down ramp produces a DC shift in the differentiated waveform which varies as a function of the number of pulses seen over a given ramp time, thereby causing nonuniform pulse amplitudes, which can lead to inaccurate distance measurement. Furthermore, an up-down ramp can generate intensity pulses in two opposite polarities, requiring electronics that detect both polarities. Also, the up-down ramp waveform introduces inaccuracy due to the abrupt change in the waveform slope (from positive to negative).

DISCLOSURE OF THE INVENTION

Objects of the invention include provision of laser-based liquid level and/or distance measurement, which reduces speckle noise, which uses minimal, low speed electronics, and which minimizes inaccuracies caused by discontinuities of the laser drive signal.

According to a first aspect of the present invention, a laser, such as a laser diode, having a variable operating frequency controlled by a laser drive signal, emits an output light which is converted to a collimated beam and incident upon a target (or float) having predefined optical properties; the output light is reflected by the target and fed back into the laser; coherent interference occurs between the reflected light and the light within the laser, thereby producing a feedback signal having a magnitude related to the distance from the laser to the target. According further to the invention the target is floating on a liquid. According still further to the invention, a tube is employed to house the float and the liquid to be measured.

According to a second aspect of the invention, a laser, such as a laser diode, having a variable operating frequency controlled by a laser drive signal, emits an output light which is converted to a collimated beam and incident upon a liquid; the liquid is contained in a tube having a diameter and made of a material such that a meniscus effect occurs, thereby allowing the liquid to act as a curved reflective surface; the output light is reflected by the liquid and fed back into the laser; coherent interference occurs between the reflected light and the light within the laser, thereby producing a feedback signal having a magnitude related to the level of the liquid.

According further to the invention, the laser drive signal has a shape chosen so as to minimize electronics.

According to a third aspect of the present invention, a laser, such as a laser diode, having a variable operating frequency controlled by a laser drive signal, emits an output light which is converted to a collimated beam and incident upon a target (or float) having predefined optical properties; the output light is reflected by the target and fed back into the laser; coherent interference occurs between the reflected light and the light within the laser, thereby producing a feedback signal having a magnitude related to the distance from the laser to the target; a portion of the feedback signal is not used (blanked-out) to prevent disruption of the distance measurement due to abrupt changes in the laser drive signal (i.e., when intensity discontinuities occur) and/or due to electronic noise (caused by signal differentiation or other signal processing).

The present invention employs techniques which improve accuracy and realizability of laser liquid level measuring sensors by reducing speckle, minimizing electronic components, allowing low frequency electronics to be used, and minimizing the effects of current drive discontinuities which can cause inaccuracies in liquid level measurement. The invention may be used for any liquid level measurement application, e.g., a gas gauge or oil level sensor for a vehicle. A further advantage of the invention is that it uses coherent light; thus, it requires minimal optical backscatter (nanowatts) and it is undisturbed by incoherent light such as sunlight, street lights, or car headlights. Furthermore, if the tube is used, the tank may be filled with loose baffles to further reduce liquid sloshing in the tank without interfering with the float or the measurement process.

The foregoing and other objects, features, and advantages of the present invention will become more apparent in the light of the following detailed description of exemplary embodiments thereof, as illustrated in the accompanying drawings.

BRIEF DESCRIPTION OF THE DRAWINGS

FIG. 3 is two bottom views of a tube within the device of FIG. 1 showing (a) a screened bottom, and (b) a sealed bottom with a porthole.

BEST MODE FOR CARRYING OUT THE INVENTION

Figure 1:
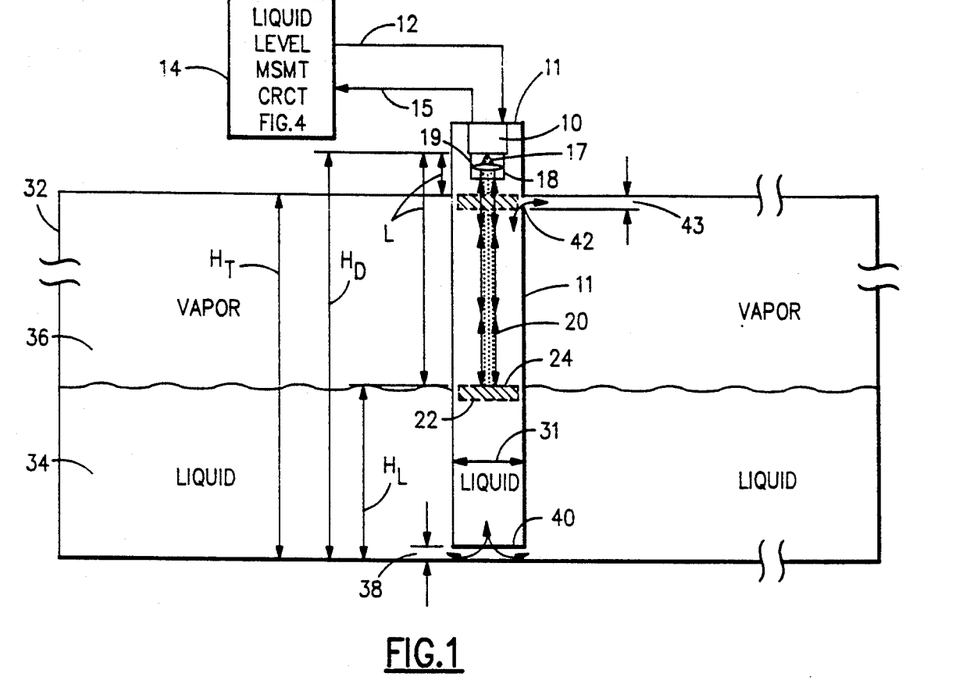
FIG. 1 is a diagram of a liquid level measurement device in accordance with the present invention.

Referring to FIG. 1, a laser diode liquid level measurement device includes a known laser diode assembly 10, e.g., a Mitsubishi ML3101, which comprises a laser diode and a photodiode, similar to that shown in FIG. 1 of copending U.S. patent application Ser. No. (800,335), filed contemporaneously herewith. The laser diode assembly 10 is mounted to the top end of a cylindrical tube 11 (discussed hereinafter) and is driven by a current drive signal on a line 12 from a liquid level measurement circuit 14 (discussed hereinafter). The laser diode assembly 10 provides an electronic feedback signal on a line 15 (from a photodiode within the laser diode assembly) indicative of optical feedback from the laser diode. The liquid level measurement circuit 14 reads the signal on the line 15 and provides a signal on a line 16 indicative of the height of the liquid (or fluid) $H_L$. The laser diode assembly 10 also provides a divergent output light 17.

A lens assembly 18 is mounted to the laser diode assembly 10 comprising a known lens 19, e.g., a graded index rod microlens (GRIN lens), Nippon Sheet Glass Company (NSG) W30-0110-078, having a diameter of 3 mm, a length of 3.3 mm, and anti-reflective coating. The lens 19 is placed a known distance, e.g., 3/16", from the laser diode assembly 10 so as to provide a collimated output laser beam 20 having a diameter of about ⅛". Other diameters may be used if desired provided the intensity is high enough to provide adequate reflected light. Alternatively, the lens 19 may be directly connected to the laser diode assembly 10. The collimated beam 20 is incident upon a float (or target) 22 which is a variable distance L from the laser assembly 10. The float reflects laser light back through the lens 19 into the laser diode assembly 10, which promotes coherent interference within the laser diode as discussed hereinbefore. The output signal on the line 15 from the laser diode assembly 10 exhibits pulses, superimposed on the drive signal waveform, indicative of the distance L from the front of the laser diode assembly 10 to the float 22, as discussed hereinbefore.

The size of the float is ¼" in diameter (slightly less than the diameter of the tube 11) and approximately 3/16" thick; however, other geometries and thicknesses may be used if desired. The float may be made of solid or hollow plastic, wood, or any other buoyant material. The top surface 24 of the float 22 is coated with a reflective tape, e.g., Scotchlite brand reflective tape, to provide maximum reflection of the collimated laser beam 20 back to the laser diode assembly 10. Both the upper and lower side of the float may be covered with reflective tape if desired in case the float flips-over. Alternatives to reflective tape may be used provided adequate reflection is provided.

The float 22 is housed in the cylindrical tube 11, having a diameter 31 of about ⅜", which is disposed in a tank 32, having a typical height $H_T$ of about 1 ft, containing liquid 34, e.g., gasoline, and vapor (or air) 36. The top end of the tube 11 is raised above the top of the tank 32 to ensure the lens assembly 18 is flush with or above the top of the tank to allow level measurement when the float 24 is at the top of the tank. The tube 11 extends into the tank 32 a distance which is slightly less than the height $H_T$ of the tank by a distance 38, e.g., ¼". The tube 11 may be made of glass, plastic, metal, or another non-porous material. Alternatively, the entire tube 11 may be a mesh, screen, or perforated material, but this increases the fluid turbulence seen by the float 22. Also, the tube 11 need not be cylindrical in shape, provided the float may move vertically as the liquid level changes. The liquid 34 enters and leaves the tube 11 from a bottom end 40 of the tube 11 which may be completely open (i.e., not covered); however, the liquid 34 may enter and leave the tube 11 from the sides instead of or in addition to the bottom 40. The tube 11 also has a vent hole 42 near the top having a diameter 43 of approximately ⅛". The vent hole 42 allows vapor to freely enter and leave the tube 11, thereby preventing a pressure differential between the vapor region within the tube 11 (above the float 22) and the vapor region 36 outside the tube 11. It should be understood that the vent hole 42 is only needed if the tube 11 is made of a solid material.

Figure 2:
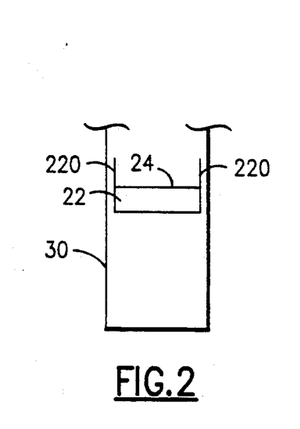
FIG. 2 is a side view of a float within the device of FIG. 1 showing optional flanges that may be added for stability.

Referring to FIG. 2, if the float 22 is very thin and it is desired to prevent the float 22 from flipping over, the float 22 may have one or more flanges 220 (or guides) protruding from the top side 24 and/or the bottom side of the float 22. However, if the flanges protrude from the bottom side of the float 22, corresponding grooves may need to be placed in the tank 32 to allow fluid level measurement to the bottom of the tank 32.

Figure 3A:
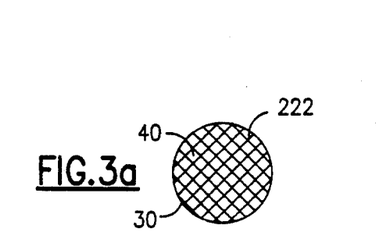
Figure 3B:
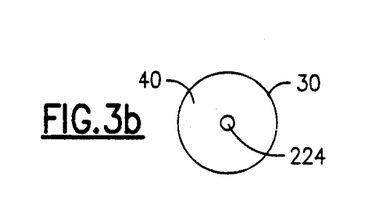

Referring to FIG. 3, the bottom end 40 of the tube 11 may alternatively be covered with a screen 222, or completely covered except for a small porthole 224. To reduce the flow rate of the liquid 34 in and out of the tube 11, and thereby minimize flow turbulence seen by the float 22, using the porthole 224 may be the best choice. Covering the bottom 40 of the tube 11 also prevents the float 22 from falling out of the tube 11 during installation of the tube 11 into the tank 32.

Figure 4:
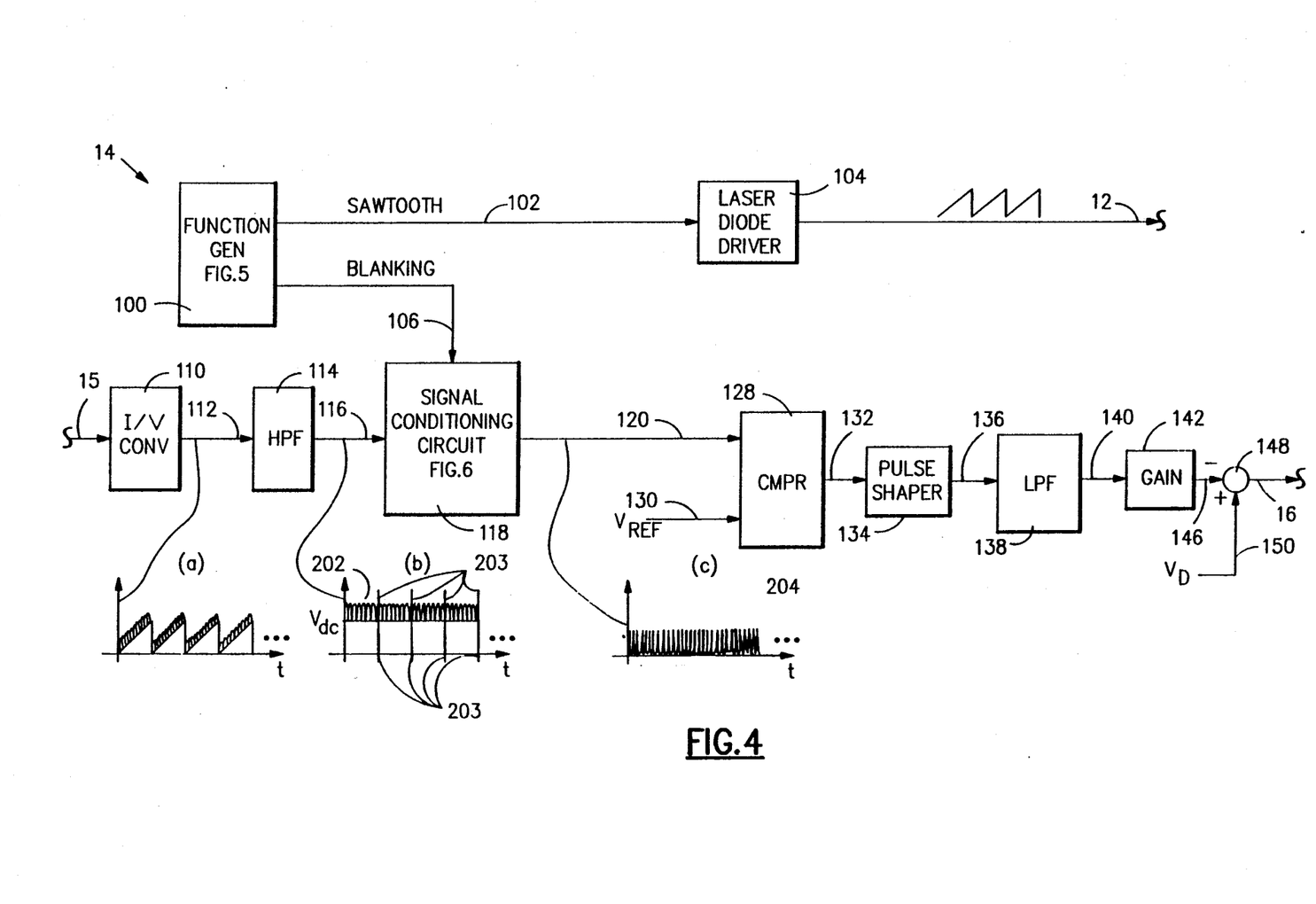
FIG. 4 is a schematic block diagram of a liquid level measurement circuit within the device of FIG. 1.

Referring to FIG. 4, the liquid level measurement circuit 14 includes a function generator 100 which provides a voltage signal on a line 102 to a laser diode driver 104, e.g., a Melles Griot, Part No. 06DLD201. The laser diode driver 104 converts the voltage signal that ramps from 0 to 20 millivolts, on the line 102 to a current signal that ramps from 29 to 31 milliamps (FIG. 7, Illust. d) on the line 12 which drives the laser diode assembly 10 (FIG. 1). Other laser diode drivers and other voltage and current ramp ranges may be used if desired. The invention drives the laser diode in the active region of the diode with a current drive sawtooth waveform signal on the line 12 comprising a succession of periodic positive sloped ramps (FIG. 7, Illust. d), with a dc offset of approximately 30 milliamps. Other signal offsets and ranges may be used if desired. The sweep frequency of the current drive waveform on the line 12 is 2 KHz; however, other frequencies may be used if desired, as discussed hereinafter. The function generator 100 also provides a blanking signal on a line 106 (discussed hereinafter).

Figure 5:
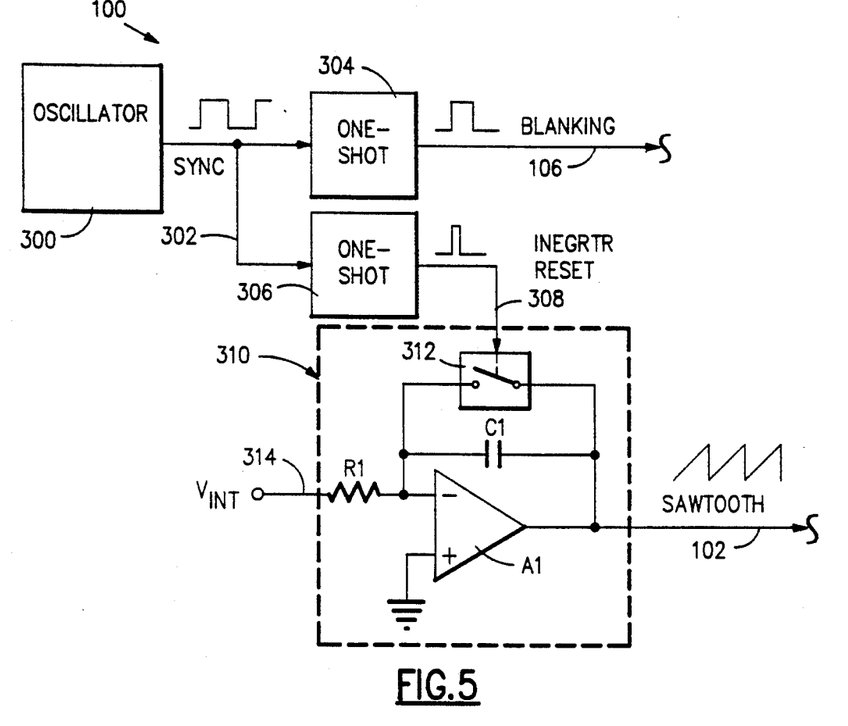
FIG. 5 is a schematic block diagram of a function generator circuit within the circuit of FIG. 4.

Referring now to FIG. 5, the function generator 100 includes an oscillator 300, e.g., a Texas Instruments 555 counter/timer with associated external resistors and capacitors. The oscillator 300 provides a square-wave sync signal (FIG. 7, Illust. a) on a line 302 to the rising-edge input of a first one-shot device 304, e.g., National Semiconductor CD4528B, which provides a high pulse of a predetermined time duration, e.g., 10 microseconds, on the line 106 when the sync signal changes from a low to a high state. The resulting waveform (FIG. 7, Illust. b) is a narrow high pulse at the beginning of each period of the sawtooth waveform (FIG. 7, Illust. d) and is called a blanking signal (discussed hereinafter).

Figure 7:
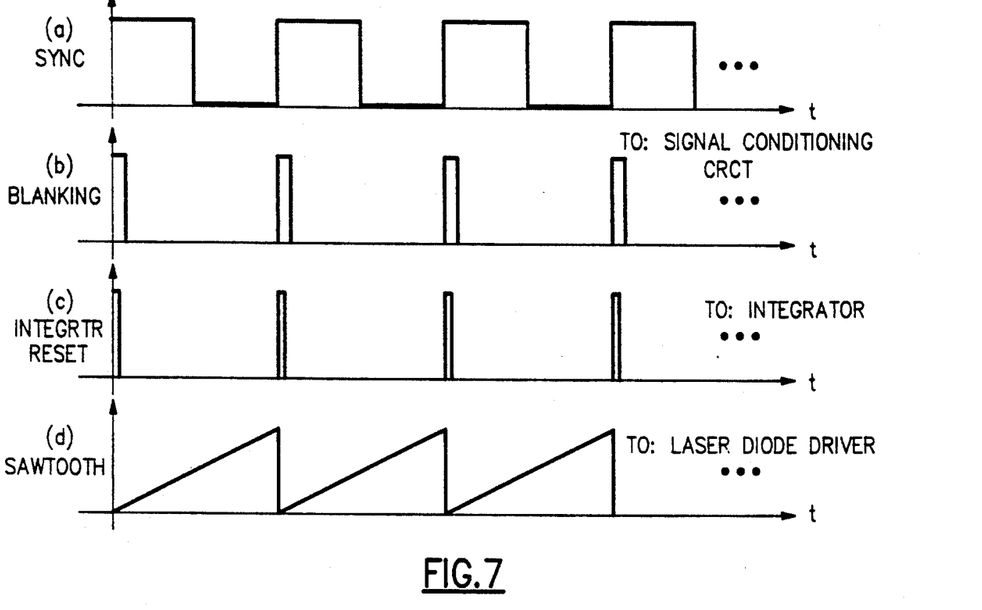
FIG. 7 is a plot of signals generated by the function generator circuit within the circuit of FIG. 4.

The sync signal on the line 302 is also connected to the rising-edge input of a second one-shot device 306 (similar to the first one-shot 304) which also provides a high pulse signal of a predetermined time duration less than the time duration of the blanking signal, e.g., 1 microsecond, on a line 308 when the sync signal changes from a low to a high state, called an integrator reset signal (FIG. 7, Illust. c). The line 308 is connected to a resettable electronic integrator 310, comprising and opamp A1 with a capacitor C1 and resistor R1 configured in a standard inverting integrator configuration, and an analog switch 312, e.g., Analog Devices AD7512, in parallel with the capacitor C1 to provide reset capability.

A predetermined integrator reference voltage $V_{int}$ is provided on the line 314 to the integrator 310 which integrates the voltage $V_{int}$ at a rate determined by the resistor R1 and capacitor C1, as is known. The integrator reset signal on the line 308 is provided to the integrator 310 and fed to the analog switch 312 therein. When the integrator reset signal is low, the switch is open and the integrator 310 integrates the input signal $V_{int}$. Conversely, when the integrator reset signal is high, the switch 312 is closed, thereby shorting-out the capacitor C1 and driving the output voltage on the line 102 to 0 v. The resulting signal is a sawtooth waveform (FIG. 7, Illust. d) on the line 102 which is used to drive the laser diode assembly 10. It should be understood that the time duration of the integrator reset pulses must be long enough to allow the capacitor C1 to discharge to the desired beginning ramp voltage level. Other implementations of the resettable integrator 310 may be used if desired.

Referring to FIG. 4, the current signal on the line 15 from the laser diode assembly 10 (FIG. 1) is provided to a known current-to-voltage (I/V) converter 110 which converts the input current to an output voltage on a line 112, having characteristics similar to the input current, i.e., ramps and pulses related to intensity changes, but with units of voltage. The I/V converter 110 comprises a high-bandwidth low-noise operational amplifier, the photodiode within the laser diode assembly 10, resistors, capacitors, and a bias voltage, similar to that described in the aforementioned copending patent application. The I/V also reduces high frequency noise by attenuating frequencies greater than 1.6 MHz and shifts the dc level of the output voltage to the desired level. The output voltage signal on the line 112, resembling a waveform 200 (FIG. 4, Illust. a), is related to the current through the photodiode as described in the aforementioned copending patent application. The change in output ramp voltage is about 150 millivolts, corresponding to a 2 mA change in the laser diode drive current ramp (and hence output intensity), from 29 to 31 mA. Similarly, voltage pulses ranging from 1 to 2 millivolts peak correspond to current pulses indicative of the optical coherent interference discussed hereinbefore. Other electronic configurations for the I/V converter 110 may be used if desired. The voltage signal on the line 112 is provided to a high pass filter (HPF) 114 which acts as a differentiator to separate and amplify the high frequency pulses (FIG. 4, Illust. a) from the lower frequency sawtooth (FIG. 7, Illust. d). More specifically, the high pass filter 114 is a single pole filter with a positive slope of 20 db/decade having a DC gain of zero and a break frequency of 120 KHz beyond which the magnitude of the filter gain is flat at a gain of 10. The output of the high pass filter 114 provides a differentiated signal similar to that shown by the waveform 202 (FIG. 4, Illust. b). The filter 114 comprises opamps, e.g., OP470, resistors, and capacitors in a known negative feedback configuration, similar to that described in the aforementioned copending patent application. Other opamps and component configurations may be used if desired.

The differentiated signal from the high pass filter 114 is provided on a line 116 to a signal conditioning circuit 118. The signal conditioning circuit 118 amplifies the signal on the line 116, e.g., by 50, removes the dc offset from the waveform, zeros (or blanks-out) a portion of the signal, shifts the dc level of the signal to provide a consistent value (0 v) for the low portion of the signal, and provides some limited high frequency filtering. The resulting signal (FIG. 4, Illust. c), provided on a line 120, has a series of pulses extending from a common minimum voltage (reference plane) of approximately zero volts. Other common minimum voltages may be used if desired.

Figure 6:
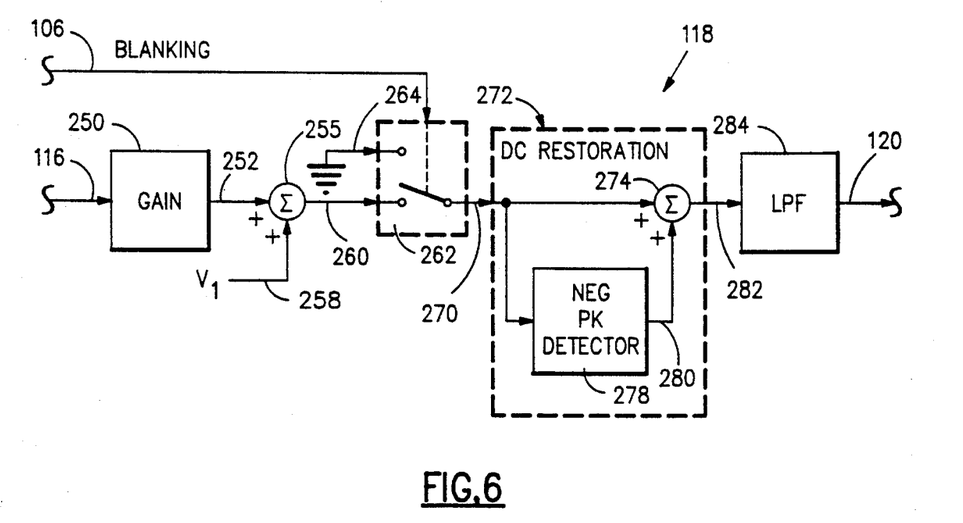
FIG. 6 is a schematic block diagram of a signal conditioner circuit within the circuit of FIG. 4.

More specifically, referring to FIG. 6, the signal conditioning circuit 118 includes a gain stage 250 (i.e., an amplifier), comprising known electronics such as opamps and resistors, which amplifies the differentiated signal on the line 116 by 50. Other gain stages may be used if desired. The amplified differentiated signal is fed on a line 252 to a first input of a summer 255 where it is added to a predetermined dc voltage V1 fed on a line 258 to a second input of the simmer 255 having the same magnitude and opposite sign of the dc component Vdc (FIG. 4, Illust. b) of the amplified differentiated signal on the line 252, and the resulting signal is provided on a line 260 having the dc component removed (compare Illusts. b and c, FIG. 4).

We have found that when the diode current drive signal on the line 12 (FIGS. 1,4) abruptly changes slope (i.e., exhibits a discontinuity), high frequency harmonics are generated on the optical feedback signal causing additional pulses to occur for a short time, e.g., 10 microseconds, near the discontinuity, thereby distorting the distance measurement. We have also found that the signal on the line 116 exhibits spikes 203 (FIG. 4, Illust. b) on the falling edges of the sawtooth signal due to the differentiator effects of the high pass filter 114 and causes an overall shift in the signal level which causes inaccuracies in the measurement of the pulses. Furthermore, we have found that zeroing or blanking-out the signal during this time eliminates this measurement distortion without sacrificing any appreciable accuracy, as discussed in the aforementioned copending patent application.

The signal on the line 260 from the summer 255 is fed to one input of a known analog switch 262, e.g., Analog Devices, Analog Switch, Part No. AD7512. The other input of the switch 262 is connected to a line 264 which is connected to ground (0 v). The blanking signal (FIG. 7, Illust. b) on the line 106 from the function generator 100 is also fed to the switch 262 and controls the selection of the output signal provided on a line 270. When the blanking signal is high, the switch 262 connects the signal from the summer 255 on the line 260 to the line 270. Similarly, when the blanking signal is low, the switch 262 connects the 0 v signal on the line 260 to the line 270. As discussed hereinbefore, the blanking signal (FIG. 7, Illust. b) exhibits a short duration pulse during discontinuities of the current drive sawtooth signal (FIG. 4, Illust. d), i.e., at the end of the ramp. Thus, the output signal on the line 270 looks just like the input signal on the line 260 except that the signal is set to 0 v for a short period, e.g., 10 microseconds, at the beginning of each current ramp (due to the blanking signal pulses). Therefore, these pulses, in effect, blank-out the signal on the line 260. If noise due to high frequency components in the optical feedback signal reflected back from the target 26 or from the high pass filter is not a problem, the switch 262 may be removed if desired.

Figure 8:
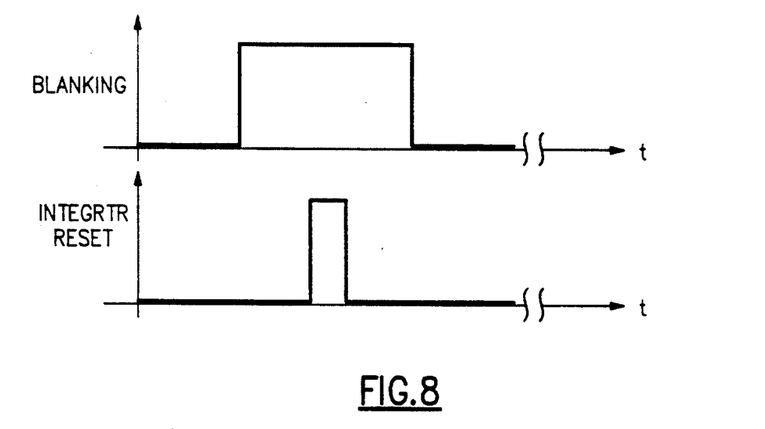
FIG. 8 is a blow-up plot of a pulse of a blanking signal and an integrator reset signal.

Referring to FIG. 8, ideally, for a given period of the sawtooth waveform signal (FIG. 7, Illust. d) each blanking signal pulse (FIG. 7, Illust. b) on the line 106 should have its rising edge before each pulse of the integrator reset signal (FIG. 7, Illust. c) on the line 308 and have its falling edge after each pulse of the integrator reset signal to ensure the desired signal is blanked-out for a short time before and after the falling edge of the sawtooth waveform. However, the rising edges of the blanking and integrator reset signals may occur at the same time (as in FIG. 7) because there is enough time delay between the falling edge discontinuity of the sawtooth waveform and its effect on the feedback signal on the line 15 from the laser diode assembly 10 to allow the switch 262 to blank out the desired signal.

In FIG. 6, the signal conditioning circuit 118 also includes a DC restoration circuit 272 to which the signal on the line 270 is fed. The DC restoration circuit 272 shifts the input signal such that the low magnitude portion of the signal is always the same value, e.g., 0 v. The signal on the line 270 is fed to a first input of a summer 274 and also to a negative peak detector 278. The negative peak detector 278 provides a positive signal on the line 280 indicative of the average lowest value (e.g., within the past 2 milliseconds) of the input signal. The signal on the line 280 is fed to a second input of the summer 274, thereby shifting up the signal on the line 270 by the amount it was below zero volts. The resultant signal is provided on a line 282. The reasons for using the DC restoration circuit are the same as described in the aforementioned copending patent application.

The signal from the dc restoration circuit 272 on the line 282 is fed to a known low pass filter 284 comprising opamps, resistors, and capacitors, configured in a known negative feedback arrangement. The break frequency of the filter 284 is 1 MHz. The filter removes unwanted high frequency noise from the signal before being fed to the rest of the circuit on the line 120. Another or no low pass filter may be used if desired, depending on the amount and frequency of the noise present. Other circuit configurations for the signal conditioning circuit 118 or any part thereof may be used if desired.

Referring now to FIG. 4, the signal on the line 120 from the signal conditioning circuit 118 is fed to a first input of a comparator circuit 128. A reference voltage signal Vref is provided on a line 130 to a second input of the comparator circuit 128. The magnitude of the reference signal is set to a predetermined level, e.g., using a voltage divider, above the noise floor of the differentiated, pulsed, blanked-out, signal on the line 120, and below the lowest peak of the pulses expected on the input signal. The comparator provides an output signal on a line 132 having either a low, e.g., 0 v, or a high, e.g., 5 v, state. When the magnitude of the input signal on the line 120 is greater than the magnitude of the reference voltage on the line 130, the output signal of the comparator circuit 128 on the line 132 is high. Conversely, when the magnitude of the input signal is less than the magnitude of the reference signal, the output signal of the comparator circuit 128 on the line 132 is low. The comparator circuit 128 comprises a known comparator, e.g., LM211H, with positive feedback added to provide hysteresis, e.g., $+/-5$ millivolts, to the threshold set by the reference signal, thereby avoiding spurious noise from causing the output signal to change state. The comparator circuit 128 also provides pulses having a more uniform output amplitude, e.g., 5 volts, and less noise than the input signal on the line 120. Other configurations for the comparator circuit 128 may be used if desired.

The signal from the comparator circuit 128 on the line 132 is fed to a known pulse shaper 134 comprising, e.g., a one-shot. The pulse shaper 134 provides pulses on a line 136 that are cleaner, i.e., pulses are more square and the edges more vertical, than the signal from the comparator 128 on the line 132, and have a constant predetermined time duration, e.g., 1 microsecond.

The pulsed output signal from the pulse shaper 134 is provided on a line 136 to a known low pass filter 138. The low pass filter 138 comprises an opamp, resistors, and capacitors in a known negative feedback arrangement. The break frequency of the low pass filter 138 is 0.02 Hz (corresponding to a time constant of about 10 seconds); however, other frequencies may be used if desired. The low pass filter 138 provides a signal on a line 140 indicative of the average value of the signal on the line 140 which is directly related to the duty cycle and, thus, the number of pulses on average seen on the feedback signal from the laser diode (because the pulse width is constant). Therefore, the low pass filter provides a signal proportional to the distance L to the float 22 (FIG. 1).

The signal on the line 140 is fed to a gain stage 142, which multiplies the magnitude of the signal on the line 140 by a predetermined value, e.g., $cK/2\Delta F$, where K is the proportionality constant relating the dc level on the line 140 and the number of pulses N, to provide a signal on a line 146 indicative of the distance L to the float 22 in the desired units, e.g., inches. The signal on the line 146 is fed to a negative first input of a summer 148 and a voltage signal Vd indicative of the height $H_D$ (FIG. 1) from the bottom of the laser diode assembly 10 to the bottom of the tank 32 is fed to a second input to the summer 148. The simmer 148 subtracts the distance L from the distance $H_T$ and the resultant signal on the line 16 is indicative of the height of the liquid $H_L$ from the bottom of the tank 32 near the tube 11. The height $H_L$ may then be easily converted to the volume, e.g., in gallons, of liquid in the tank 32.

As discussed hereinbefore, the invention uses a sawtooth waveform signal (FIG. 7, Illust. d) to drive the laser diode assembly 10. It is known that the number of pulses seen on the feedback signal (FIG. 4, Illust. a) on the line 15 is proportional to the distance and velocity of the float 22 (or target; FIG. 1), as discussed hereinbefore and in the aforementioned copending patent application. It is also known that the polarity of the velocity pulses Fd is determined by the direction the float 22 is moving. More specifically, if the target is moving toward the laser, the velocity pulses will be positive, and if moving away, negative (i.e., the polarity is determined by the direction of the velocity component of the target).

With the float floating on the liquid 34 in the tank 32 the liquid height $H_L$ oscillates due to ripples along the surface of the liquid 34 caused by tank motion and other effects. However, height oscillations vary an equal amount above and below the steady state (still) liquid level. Thus, the distance pulses Fx, on average, will be equal to the steady state liquid level. Also, we have found that the velocity of the float in both directions is approximately symmetrical. Thus, the number of velocity pulses Fx for the sawtooth ramp waveform adding to the distance Fx in one direction will equal the number of velocity pulses Fd subtracted from Fd in the other direction. Therefore, on average, the velocity effect seen on the dc level from the filter 138 will equal zero (the desired steady state value).

It is known that using coherent light causes speckle noise to appear on the feedback signal, as discussed hereinbefore. It is also known that the size (diameter) of the optical speckle noise seen at the lens aperture is proportional to the diameter of the beam when it hits the target and is described by the known relation:

$$D_s = \lambda_t L/D_b \qquad \text{Eq. 4}$$

where $D_s$ is the diameter of the optical speckle noise, $D_b$ is the diameter of the incident beam, L is the distance from the target to the laser, and $\lambda$ is the wavelength of the incident light. Thus, the smaller the incident beam diameter, the larger the speckle diameter. If the speckle diameter $D_s$ is large, the optical feedback signal will exhibit drop-outs as the distance to the target changes, i.e., large drops in intensity at certain distances. This drop-out can prevent a distance measurement because the amount of light between speckles may be so low that it won't be detected by the comparator 128. Because speckle noise is related to beam diameter, using a collimated bean provides constant speckle noise as the target moves (because the diameter of the beam is a constant), thereby providing a constant noise floor from which to measure the intensity pulses on the feedback signal. This speckle principle holds independent of laser drive sweep frequency.

We have found that using a collimated beam, instead of a focussed beam as used in Beheim et al. and Lang et al., together with reflective tape on the target, provides constant speckle noise as the target moves and still provides adequate optical feedback intensity. Thus, when using a collimated beam and a "cooperative" target (i.e., a target having tailored reflective properties) like the float 22, low frequency electronics may be used to drive the laser diode and analyze the feedback signal. Although a sawtooth drive frequency of the invention is 2 KHz, other drive frequencies of the sawtooth (lower or higher) may be used if desired.

Although the invention uses a liquid level measurement, the invention will work equally well when used to measure distances to "cooperative" reflective targets other than those floating on a liquid, provided the target has adequate reflectivity and the collimated beam has sufficient power to provide the needed optical feedback intensity.

It should be understood that although using the sawtooth waveform (FIG. 7, Illust. d) minimizes the electronics needed for processing the feedback signal and computing liquid level, other waveforms may be used, such as an up-down ramp or an up-ramp followed by a flat down step (as in the aforementioned copending patent application), provided the speckle noise is reduced using a collimated bean and target with reflective tape or equivalent reflective properties.

It should be understood by those skilled in the art that there are many other known acceptable circuit configurations available to implement the signal processing functions performed by the liquid level measurement circuit 14, i.s., isolating the pulses and characterizing the number of pulses per ramp cycle. Also, even though the invention has been illustrated as being implemented using hardware electronic devices, it should be understood by those skilled in the art that the invention will work equally well if the hardware circuits 100,114,118,122,128,134,138,142,148 are implemented by a computer in software, and an A/D converter is added to convert the signal on the line 112 to digital bits at a rate of at least twice the fastest frequency to be converted, e.g., an A/D rate of 1.5 Mhz is sufficient for 300 pulses over a 0.5 millisec. ramp.

Also, it should be understood that the liquid level $H_L$ may be converted into a volume level, percent, or fraction of liquid in the tank by known calculations using the dimensions and geometry of the tank. If done in software and used in a vehicle application, many different tank geometries may be pre-stored in memory and retrieved based on the make and model of the vehicle.

Also, instead of using a tube 11, the tank 32 geometry may have a region which isolates liquid in an area suitable to hold the float. Furthermore, if the tube 11 is used, the tank may be filled with loose baffles to further reduce liquid sloshing in the tank without interfering with the float or the measurement process.

Although the invention has been described as using a semiconductor diode, the invention will work equally well with any laser having an optical operating frequency that may be varied (or chirped) over an acceptable range and other characteristics compatible for distance measurement (discussed hereinbefore).

Figure 9:
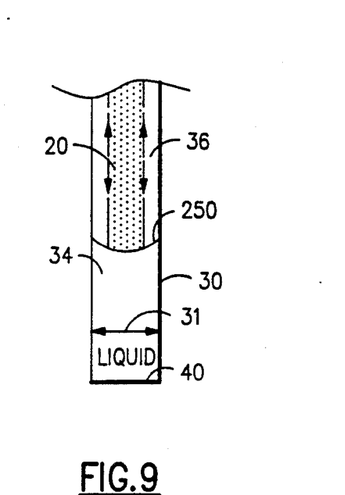
FIG. 9 is an alternative embodiment of the present invention that does not use a float.

Instead of using a float, the surface of the liquid may be used to reflect the beam 20 as shown in the alternative embodiment of FIG. 9. The diameter 31 of the tube 11 is small enough to cause a known meniscus effect, and the surface 250 of the liquid 34 curves up (wets the tube 11 sides). The meniscus effect depends on the material composition of the tube 11 and the type of liquid 34 being measured. The curved liquid surface 250 acts as a curved (concave) reflecting surface (due to Fresnel reflection) which the beam 20 reflects from and provides a focussed beam having a focal length equal to half the radius of curvature of the surface 250. If the distance from the laser assembly 10 to the liquid is much greater than the focal length (i.e., the radius of curvature of the surface 250 is large), the returning beam 20 appears, from the perspective of the laser assembly 10 (FIG. 1), to be a collimated beam. It should be understood that the meniscus effect, and thus the amount of curvature of the surface 250, is constant, independent of the liquid level and motion of the liquid within the tank 32. Therefore, the reflectivity of the liquid surface 250 will be constant. It should be understood that although some scattering of the incident light may occur, most of the light will be reflected back to the laser assembly 10. A flat bare liquid surface may not be used because there is only one precise condition of the liquid (e.g., perfectly flat with no ripples and exactly normal to the incident beam 10) where it will reflect the beam 20 directly back to the laser assembly 10. Thus, a flat liquid surface is very sensitive to motion of the liquid within the tank 32.

Furthermore, it should be understood by those skilled in the art that the signal processing function of blanking-out a portion of the feedback signal from the laser diode assembly 10 (FIG. 1) will provide its intended function (i.e., to remove unwanted noise associated with discontinuities in the laser drive signal) independent of the type of laser beam used (i.e., focussed or collimated) and independent of the type of target used (i.e., cooperative or not).

Other patents relating to optical coherent distance measurement include U.S. Pat. No. 4,733,609, Goodwin et al., and other patents relating to optical liquid level measurement include U.S. Pat. Nos. 4,689,489, Cole and 4,938,590, Ishida.

Although the invention has been described and illustrated with respect to exemplary embodiments thereof, it should be understood by those skilled in the art that the foregoing and various other changes, omissions and additions may be made without departing from the spirit and the scope of the invention.

We claim:

1. A laser-based distance measuring device for measuring the distance to a cooperative target having predetermined highly reflective properties, comprising:
   a laser assembly, having a laser with a variable optical operating frequency, emitting an output light toward the target;
   collimating means, disposed in the path of the output light, for providing a collimated light, the collimated light being incident on the target and being reflected by the target back into said laser assembly;
   said laser assembly also providing a feedback signal having a magnitude related to the distance from said laser assembly to the target based on coherent interference within said laser between light reflected from the target and light within said laser;
   the collimated light from said collimating means together with the highly reflective properties of the target providing reduced speckle noise and substantially constant speckle noise floor over the travel range of the target;
   laser drive means, for providing a variable laser drive signal to said laser assembly for varying the optical operating frequency of said laser; and
   distance measurement means, responsive to said feedback signal from said laser assembly, for providing a distance signal indicative of the distance to the target.

2. Apparatus of claim 1 wherein said laser drive signal comprises a sawtooth waveform.

3. Apparatus of claim 1 wherein the target is covered with reflective tape.

4. Apparatus of claim 1 wherein said distance measurement signal is related to the number of pulses of said feedback signal.

5. Apparatus of claim 1 wherein said laser comprises a laser diode.

6. Apparatus of claim 1 wherein the target is disposed on a liquid, the level of which is related to the distance.

7. Apparatus of claim 6 further comprising a tube for confining the target to an area near the collimated light and containing the liquid to be measured.

8. Apparatus of claim 6 wherein said distance measurement means comprises means for providing a liquid level signal indicative of the level of the liquid.

9. A laser-based distance measuring device for measuring the level of a liquid, comprising:
   a tube, for containing a portion of the liquid to be measured, having a size and material composition so as to cause a meniscus effect at a surface of the liquid in said tube;
   a laser assembly, having a laser with a variable optical operating frequency, emitting an output light toward the liquid;
   calibrating disposed in the path of the output light, for providing a collimated light, the collimated light being incident on the liquid and being reflected by the liquid back into said laser assembly;
   laser drive means, for providing a variable laser drive signal to said laser assembly for varying the optical operating frequency of said laser;
   said laser assembly also providing a feedback signal having a magnitude related to the distance from said laser assembly to the liquid based on coherent interference within said laser between the reflected light from the liquid and light within said laser; and
   distance measurement means, responsive to said feedback signal from said laser assembly, for providing a liquid level signal indicative of the level of the liquid.

10. Apparatus of claim 9 wherein said laser drive signal comprises a sawtooth waveform.

11. Apparatus of claim 9 wherein said liquid level signal is related to the number of pulses of said feedback signal.

12. Apparatus of claim 9 wherein said laser comprises a laser diode.

13. A laser-based distance measuring device for measuring the distance to a target, comprising:
   a laser assembly, having a laser with a variable optical operating frequency, emitting an output light toward the target, the output light from said laser assembly being incident on the target and being reflected by the target back into said laser assembly;
   laser drive means, for providing a variable laser drive signal to said laser assembly for varying the optical operating frequency of said laser;
   said laser assembly also providing a feedback signal having a magnitude related to the distance from said laser assembly to the target based on coherent interference within said laser between light reflected from the target and light within said laser; and
   signal processing means, responsive to said feedback signal from said laser assembly, for blanking-out a portion of said feedback signal coincident wit discontinuities of said laser drive signal.

14. Apparatus of claim 13 wherein said laser drive signal comprises a sawtooth waveform.

* * * * *